United States Patent Office 2,960,485
Patented Nov. 15, 1960

2,960,485

ALKYD RESIN FROM PHTHALIC ACID A TRIBASIC ACID

Benjamin A. Bolton, Gary, and Richard E. Van Strien, Griffith, Ind., assignors to Standard Oil Company, Chicago, Ill., a corporation of Indiana No Drawing. Filed June 14, 1957, Ser. No. 665,662

9 Claims. (Cl. 260—22)

Oil-modified alkyd resins using as the acid a benzene tricarboxylic acid are of satisfactory quality only at very long oil lengths. On the other hand phthalic alkyd resins are of relatively poor quality at long oil lengths. An object of the invention is an oil-modified alkyd resin suitable for use over a wide range of oil content. A particular object is an oil-modified alkyd resin containing benzene tricarboxylic acids. Another particular object is an oil-modified alkyd resin prepared by a particular sequence of reaction steps. Other objects will become apparent in the course of the description.

It has been found that oil-modified alkyd resins having an oil range between about 40% and 85% and of satisfactory coating quality over this range can be prepared by reacting a polyhydric alcohol containing at least 3 hydroxyl groups with a vegetable oil or marine oil or fatty acid; the alcoholysis reaction product is then reacted with either a benzene tricarboxylic acid or a phthalic acid; then the reaction product mixture is reacted with either a phthalic acid or a benzene tricarboxylic acid in an amount and under conditions to complete the alkyd resin preparation. If benzene tricarboxylic acid is the first acid used then phthalic acid is used to complete the resin formation; if phthalic acid is the first acid used then benzene tricarboxylic acid is used to complete the alkyd resin preparation. The amount of oil used in the alcoholysis step is determined by the amount needed to produce a particular alkyd resin which will have an oil length between about 40% and 85%. Of the total acid used about 10% will be benzene tricarboxylic acid at the 40% oil length and about 95% will be benzene tricarboxylic acid at the 85% oil length. It is preferred to have the benzene tricarboxylic acid be the first acid reacted.

The benzene tricarboxylic acids include the corresponding anhydrides. These acids are trimellitic, trimesic, hemimellitic, trimellitic anhydride and hemimellitic anhydride.

The phthalic acids also include the phthalic anhydride. These acids are orthophthalic acid, isophthalic acid, terephthalic acid, and phthalic anhydride.

If the oil length of the alkyd resin product increases the amount of benzene tricarboxylic acid which is used increases. To illustrate when the alkyd resin product has an oil length of 40%, with glycerine as the alcohol, about 10% of the acid charged is benzene tricarboxylic acid; at 60% oil length about 20% of the acid is benzene tricarboxylic and at 85% about 95% of the acid is benzene tricarboxylic acid.

The polyhydric alcohol and the oil are reacted in relative amounts such that the final resin products will have an oil length between about 40% and 85%. The relative amounts of alcohol and oil thus will be dependent upon the type of alcohol and the particular oil charged. As is customary in surface coating alkyd resin preparation, an excess of the alcohol is charged in order to get the condensation reaction with the acid toward completion. In general, the number of free-hydroxyl groups present in the alcoholysis reaction product mixture is about that needed to react with the carboxyl groups in the acid "mixture" to give an alkyd resin product.

The first step of the process of the invention involves the alcoholysis reaction of a polyhydric alcohol and a vegetable oil, marine oil, fatty acid or mixture thereof. The polyhydric alcohol may be any one of the alcohols which contains at least three hydroxyl groups. Examples of typical polyhydric alcohols which have been used in the preparation of alkyd resins may be used herein are glycerine, trimethylol ethane, pentaerythritol, dipentaerythritol, sorbitol and mannitol. Glycerine is preferred as the polyhydric alcohol for use in the first step of the process.

The polyhydric alcohol is reacted with one of the oils or fatty acids conventionally used in oil-modified alkyd resin production. The fatty acids utilized may be a mixture of fatty acids derived from one of the oils or may be a single one of the various fatty acids. The vegetable oils which are commonly used for this purpose are: linseed, soybean, tung, castor, dehydrated castor, oiticica, cocoanut, cottonseed, rapeseed, perilla, corn, poppyseed, tall, safflower. The marine oils commonly used are: herring, sardine and menhaden.

These vegetable and marine oils are often classified as drying, semi-drying and non-drying oils. Linseed oil is an example of a commonly used drying oil; soybean oil is a typical semi-drying oil; and cottonseed is an example of a non-drying oil. The oils may be processed to obtain a mixture of fatty acids which are designated by the name of the source oil. For example, soya fatty acids are derived from soybean oil. The more or less pure individual fatty acids may also be utilized in the preparation of the composition. Commonly utilized fatty acids are: capric, lauric, myristic, palmitic, stearic, behemic, oleic, linoleic, linolenic, ricinoleic, erucic.

The reaction between the alcohol and the oil in the first step is carried out under typical alcoholysis conditions. For example, the reaction is carried on at a temperature between about 150° C. and 275° C. under an inert atmosphere for a time such that the desired methanol compatibility is reached.

After the completion of the alcoholysis reaction the particular acid is charged to the alcoholysis reaction vessel and the materials reacted at temperatures in the range of 150° C. to 275° C. and more particularly 200° C. to 250° C. When the first acid has completed reaction the second acid is charged and a reaction carried on under these condensation reaction conditions, with water being continuously removed, until a resin product is obtained which is soluble in organic solvents. It has been found that at the short oil length resins the presence of the benzene tricarboxylic acid in the second step produces a material of higher hardness than is obtainable with the phthalic acid in the second step of the alkyd resin preparation procedures.

The alkyd resin product of the condensation reaction is dissolved in a suitable inert organic solvent and is then ready for use for surface coating. The organic solvent may be an aromatic hydrocarbon such as benzene, toluene, and xylene; or it may be a paraffinic hydrocarbon such as naphtha or mineral spirits; or it may be chlorinated such as chloro-benzene; or it may be an oxygenated material such as acetone or cyclohexanone; or it may be a material such as dichloroethyl ether. The type of solvent used will be dependent upon the use to which the resin is to be put.

Comparative data are presented in the annexed table on resins at 40% oil length and 60% oil length, respectively, made with phthalic anhydride and with mixtures of trimellitic acid and phthalic anhydride with different orders of acid reaction. To illustrate the procedure test No. 7 is described at some length.

In test No. 7, 180 grams of soybean oil and 48 grams of commercial glycerine were heated in the presence of calcium hydroxide catalyst at 250° C. for about 45 minutes in an agitated flask. This represents about a 15% excess of glycerine over the theoretical with the soybean oil usage set for a 60% oil length resin. After about 45 minutes a homogeneous product was produced which was soluble in methanol in a volume ratio of one part of reaction mixture to six parts of methanol.

Trimellitic acid in an amount of 18.9 grams was added to the alcoholysis product mixture and the contents were agitated at 250° C. for one hour. At this time the evolution of water from the flask had ceased and reaction was therefore complete. In the third step 75.9 grams of phthalic anhydride and 20 grams of xylene solvent were added after the flask had been cooled to 200° C. A water trap arrangement was used to separate xylene from the water-xylene vapor taken overhead. The flask was raised to 230° C. and maintained there for six hours at which time reaction was judged to be complete by the acid No. of the material in the flask. The xylene was distilled from the material in the flask and the material was then diluted to a 60% solids content with mineral spirits solvent. The properties of the resin solution and the characteristics of a coating placed on a metal strip are set out in the table.

Table (SOYBEAN OIL AND GYLCERINE)

| | 40% Oil Length | | | 60% Oil Length | | | |
|---|---|---|---|---|---|---|---|
| Test No.[1] | 1 | 2 | 3 | 4 | 5 | 6 | 7 |
| Acid, Mol Percent: | | | | | | | |
| Trimellitic | ([2]) | 10 | 10 | ([2]) | 25 | 20 | 20 |
| Phthalic Anhydride | 100 | 90 | 90 | 100 | 75 | 80 | 80 |
| Acid Reacted First | | P | T | | T | P | T |
| Glycerine Excess, Percent | 25 | 25 | 25 | 15 | 15 | 15 | 15 |
| Resin Characteristics: | | | | | | | |
| Acid No | 10 | 15 | 30 | 5 | G | 5 | 9 |
| Solids, Percent (Solvent [3]) | 50 | 50 | 50 | 60 | E | 60 | 60 |
| Viscosity, Gardner | Y-Z | Y-Z | Z-2 | U | L | Z-2 | Z-3 |
| Color, Gardner | 9 | 8 | 8 | 6 | L | 3-4 | 4 |
| Cure Time, Seconds | 24 | 23 | 13 | | E | | |
| Hardness, Sward: | | | | | | | |
| 2 weeks [4] | | | | 9 | D | 10 | 11 |
| 3 weeks [4] | 18 | 14 | 24 | | | | |
| Drying Rate: | | | | | | | |
| Set to Touch, Minutes | | | | 120 | | 75 | 90 |
| Cotton Free, Minutes | | | | 160 | | 80 | 140 |

[1] Xylene solvent cook.
[2] None.
[3] 40% oil—Xylene solvent. 60% oil—Mineral spirits solvent.
[4] Baked 30 minutes at 300° F.

In test No. 4 the conditions of test No. 7 were substantially repeated except that only phthalic anhydride was used and the process was therefore only a two step operation.

The data in runs 4 through 7 show that irrespective of the acid charged to the second step of the preparation at about 20% of trimellitic acid usage resin products of better quality were obtained with the mixed acid of the present invention procedure as opposed to phthalic anhydride alone.

Tests 1 through 3 show that with the exception of the three week hardness the mixed acid resins are of better quality than the phthalic anhydride resin alone. However, in test No. 3 wherein the trimellitic acid was reacted first the resin characteristics are better than the phthalic anhydride resin alone even in hardness.

Thus having described the invention, what is claimed is:
1. An oil-modified alkyd resin of about 40% oil-length prepared by (1) reacting glycerine and soybean oil, (2) condensing the reaction product mixture of step 1 with trimetallitic anhydride, and (3) condensing the condensation reaction product mixture of step 2 with phthalic anhydride, the trimelliitic anhydride being about 10 mol percent of the total anhydride charged, the condensation reaction being carried out at a temperature between about 200 and 250° C. with continuous removal of water until a resin is obtained in step 3 which is soluble in inert organic solvents, wherein said glycerine, said oil and said anhydrides are charged in proportion, such that the oil-length of said resin product is about 40%.

2. An oil-modified alkyd resin having an oil-length between about 40% and 85%, comprising the product made by (A) reacting, in an inert atmosphere and in the presence of an alcoholysis catalyst, a polyhydric alcohol containing at least 3 hydroxyl groups and an oily member selected from the class consisting of vegetable oil, fish oil and fatty acids containing at least 10 carbon atoms, at a temperature between about 150° C. and 275° C., until a reaction product mixture of the desired methanol compatibility is obtained, (B) condensing the reaction product mixture of A with a first acidic material selected from the class consisting of orthophthalic acid, isophthalic acid, terephthalic acid, and phthalic anhydride, and (C) condensing the product mixture of (B) with a second acidic material selected from the class consisting of trimellitic acid, trimesic acid, hemimellitic acid, trimellitic anhydride, and hemimellitic anhydride, wherein the relative amounts of said alcohol, said oily member, said first acidic material, and said second acidic material are adjusted to provide a product having an oil-length between about 40% and 85%, wherein the mol ratio usage of the hereinbefore defined first acidic material to the hereinbefore defined second acidic material is 90:10 at a product oil-length of 40% and changes with oil-length until said ratio is 5:95 is a product oil-length of 85%, and said condensation reactions are carried out at a temperature between about 150° C. and 275° C., with continuous removal of the water produced until a resin product is obtained which is soluble in organic solvents.

3. The resin of claim 2 wherein the first acidic material is phthalic anhydride.

4. The resin of claim 2 wherein the second acidic material is trimellitic anhydride.

5. The resin of claim 2 wherein the alcohol is glycerine.

6. The resin of claim 2 wherein the member is soybean oil.

7. An oil-modified alkyd resin having an oil-length between about 40% and 85%, comprising the product made by (I) reacting, in an inert atmosphere and in the presence of an alcoholysis catalyst, a polyhydric alcohol containing at least 3 hydroxyl groups and an oily member selected from the class consisting of vegetable oil, fish oil and fatty acids containing at least 10 carbon atoms, at a temperature between about 150° C. and 275° C., until a reaction product mixture of the desired methanol compatibility is obtained, (II) condensing the product mixture of (I) with a tri-acidic material selected from the class consisting of trimellitic acid, trimesic acid, hemimellitic acid, trimellitic anhydride, and hemimellitic anhydride, and (III) condensing the product mixture of (II) with a di-acidic material selected from the class consisting of orthophthalic acid, isophthalic acid, terephthalic acid and phthalic anhydride, wherein the relative amounts of said alcohol, said oily member, said tri-acidic material, and said di-acidic material are adjusted to provide a product having an oil-length between about 40% and 85%, wherein the mol ratio usage of the hereinbefore defined di-acidic material to the hereinbefore tri-acidic material is 90:10 at a product oil-length of 40% and changes with oil-length until said ratio is 5:95 at a product oil-length of 85%, and said condensation reactions are carried out at a temperature between about 150° C. and 275° C., with continuous removal of the water produced until a resin product is obtained which is soluble in organic solvents.

8. The resin of claim 7 wherein said tri-acidic material is trimellitic anhydride.

9. The resin of claim 7 wherein said di-acidic material is phthalic anhydride.

References Cited in the file of this patent

UNITED STATES PATENTS

| | | |
|---|---|---|
| 2,462,046 | Wyler | Feb. 15, 1949 |
| 2,469,371 | Colbeth | May 10, 1949 |